US009290234B2

(12) United States Patent
Inoue

(10) Patent No.: US 9,290,234 B2
(45) Date of Patent: *Mar. 22, 2016

(54) BICYCLE PEDAL

(71) Applicant: Shimano Inc., Sakai, Osaka (JP)

(72) Inventor: Akira Inoue, Osaka (JP)

(73) Assignee: Shimano Inc., Osaka (JP)

( * ) Notice: Subject to any disclaimer, the term of this patent is extended or adjusted under 35 U.S.C. 154(b) by 262 days.

This patent is subject to a terminal disclaimer.

(21) Appl. No.: 13/868,631

(22) Filed: Apr. 23, 2013

(65) Prior Publication Data

US 2014/0311282 A1 Oct. 23, 2014

(51) Int. Cl.
*B62M 3/00* (2006.01)
*B62M 3/08* (2006.01)

(52) U.S. Cl.
CPC ............. *B62M 3/086* (2013.01); *Y10T 74/217* (2015.01)

(58) Field of Classification Search
CPC .............................. B62M 3/086; Y10T 74/217
USPC ................................ 74/594.6, 594.4; 36/131
See application file for complete search history.

(56) References Cited

U.S. PATENT DOCUMENTS

| 4,898,064 | A | * | 2/1990 | Romano | B62M 3/083 36/131 |
| 4,928,549 | A | * | 5/1990 | Nagano | 74/594.6 |
| 5,060,537 | A | * | 10/1991 | Nagano | B62M 3/086 36/131 |
| 5,115,692 | A | * | 5/1992 | Nagano | B62M 3/086 280/11.31 |
| 5,419,218 | A | * | 5/1995 | Romano | B62M 3/086 36/131 |
| 6,196,084 | B1 | * | 3/2001 | Ueda | 74/594.6 |
| 6,374,699 | B1 | * | 4/2002 | Peyre | B62M 3/086 74/594.6 |
| 6,393,940 | B1 | * | 5/2002 | Ueda | 74/594.6 |
| 7,322,259 | B2 | * | 1/2008 | De Bast | B62M 3/086 36/131 |
| 8,720,305 | B1 | * | 5/2014 | Inoue | 74/594.6 |
| 9,021,918 | B2 | * | 5/2015 | Inoue | B62M 3/086 74/594.6 |
| 2003/0029271 | A1 | * | 2/2003 | Shuman | 74/594.6 |
| 2012/0125147 | A1 | * | 5/2012 | Inoue | 74/594.6 |
| 2016/0009333 | A1 | * | 1/2016 | Inoue | B62M 3/086 74/594.6 |

FOREIGN PATENT DOCUMENTS

| EP | 1219532 A2 | 7/2002 | |
| FR | 2931791 | * 12/2009 | ............. B62M 3/086 |

OTHER PUBLICATIONS

Define on at Dictionary.com, Jan. 29, 2016.*
Define On—Google Search, Jan. 29, 2016.*

* cited by examiner

*Primary Examiner* — Vinh Luong
(74) *Attorney, Agent, or Firm* — Global IP Counselors

(57) ABSTRACT

A bicycle pedal includes a pedal axle, a rotatable main pedal body, a first cleat securing member pivotally coupled about a first pivot axis between first and second positions, a sub member pivotally coupled to move about a second pivot axis, and at least a first biasing member disposed on the second pivot axis. The second pivot axis is farther from the pedal axle than the first pivot axis. The first biasing member is operatively disposed between the main pedal body and the first cleat securing member to bias the first cleat securing member toward the first position. The first cleat securing member and the sub member rotate together about the second pivot axis until the sub member abuts against the main pedal body, and the first cleat securing member subsequently rotates toward the second position about the first pivot axis independently from the sub member during a step-in operation.

13 Claims, 11 Drawing Sheets

BICYCLE PEDAL

BACKGROUND

1. Field of the Invention

This invention generally relates to a bicycle pedal. More specifically, the present invention relates to bicycle pedal that can be releasably attached to a cleat of a cycling shoe.

2. Background Information

A conventional clipless pedal that can connect to a cleat attached to a shoe is a known example of a bicycle pedal that can connect to a cycling shoe (e.g., European Patent Application Publication No. 1,219,532). When a clipless type bicycle pedal is used, the crank can be rotated during a down stroke as well by pulling upward. As a result, the crank can be rotated more efficiently.

A conventional clipless bicycle pedal includes a pedal axle that can be attached to a crank of a bicycle, a main pedal body rotatably supported on the pedal axle, and a coupling mechanism. The coupling mechanism is fixed to two opposite faces of the pedal main pedal body and has a first cleat securing member configured to couple with a front portion of a cleat and a second cleat securing member configured to couple with a rear portion of the cleat. The first cleat securing member is non-rotatably fixed to the main pedal body and the second cleat securing member is rotatably coupled to the main pedal body. The second cleat securing member is forced in a direction of coupling with a cleat by a torsion coil spring or other force exerting member.

With such a conventional bicycle pedal, a cleat disengagement operation is executed by pushing the heel of the shoe outward (twisting the shoe) while the shoe is coupled to the pedal. When the heel of the shoe is pushed outward, the second cleat securing member is rotated in a disengagement direction against the exerted force of the force exerting member. As a result, a front end of the cleat separates from the first cleat securing member and the shoe can be removed from the pedal.

SUMMARY

With such a conventional bicycle pedal, the pivot pin and the spring of the second cleat securing member (rotatably coupled to the main pedal body) are located relatively close to a pedal axle. With such an arrangement, mud tends to stick to around the center portion of a bicycle pedal (i.e. around a pedal axle) during riding in muddy conditions. Thus, in the conventional structure, mud tends to stick to the spring, which is relatively close to the pedal axle. Mud does not always come off easily from the bicycle pedal due to the shape and location of the spring relatively close to the pedal axle. Accordingly, one object of this disclosure is to provide a bicycle pedal with improved mud clearing ability.

Also, with such a conventional bicycle pedal, if the biasing force of the spring is increased in order to prevent accidental disengagement of the cleat from the bicycle pedal during riding (i.e., to hold the cleat more securely during extreme riding), the step-in operation may become difficult for some riders due to increased force needed for step-in. On the other hand, if the biasing force of the spring is decreased in order to obtain an easier step-in operation, accidental disengagement of the cleat from the bicycle pedal may occur during riding such as during extreme off-road (mountain bike) riding. In other words, it can be difficult to obtain an ideal spring force during riding and for a relatively easy step-in operation for some riders. Accordingly, another object of this disclosure is to provide a bicycle pedal, which facilitates a relatively easy step-in operation yet reduces the possibility accidental disengagement of the cleat from the bicycle pedal during riding.

In accordance with a first aspect of the present invention, a bicycle pedal is proposed that basically comprises a pedal axle, a main pedal body, a first cleat securing member, a sub member, and at least a first biasing member. The main pedal body is rotatably supported on the pedal axle. The first cleat securing member is pivotally coupled relative to the main pedal body about a first pivot axis between a first position and a second position. The sub member is pivotally coupled to the main pedal body to move about a second pivot axis. The second pivot axis is farther from the pedal axle than the first pivot axis. The first biasing member is disposed on the second pivot axis. The first biasing member is operatively disposed between the main pedal body and the first cleat securing member to bias the first cleat securing member toward the first position. The first cleat securing member, the sub member, the first biasing member and the first and second pivot axes are arranged relative to the main pedal body so that the first cleat securing member and the sub member rotate together about the second pivot axis until the sub member abuts against the main pedal body, and the first cleat securing member subsequently rotates toward the second position about the first pivot axis independently from the sub member during a step-in operation.

In accordance with a second aspect of the present invention, the bicycle pedal of the first aspect is configured so that the sub member is mounted on the main pedal body by a support shaft that supports the first biasing member on the main pedal body.

In accordance with a third aspect of the present invention, the bicycle pedal of the second aspect is configured so that the first biasing member includes at least one first torsion spring, and the support shaft extends through the coiled portion of the at least one first torsion spring.

In accordance with a fourth aspect of the present invention, the bicycle pedal of the first aspect is configured so that the first cleat securing member is pivotally mounted on the sub member about the first pivot axis.

In accordance with a fifth aspect of the present invention, the bicycle pedal of the first aspect is configured so that the first cleat securing member has a first cleat engagement surface located farther from the second pivot axis than the first pivot axis.

In accordance with a sixth aspect of the present invention, the bicycle pedal of the first aspect is configured so that the main pedal body includes an abutment member, the first cleat securing member and the sub member rotate together until the sub member abuts against the abutment member, and the first cleat securing member subsequently rotates toward the second position independently from the sub member during a step-in operation.

In accordance with a seventh aspect of the present invention, the bicycle pedal of the sixth aspect is configured so that the abutment member is coupled to the main pedal body in a press-fit manner.

In accordance with an eighth aspect of the present invention, the bicycle pedal of the sixth aspect is configured so that the abutment member is adjustably coupled to the main pedal body so that an amount of movement of the sub member before contacting the abutment member is adjustable.

In accordance with a ninth aspect of the present invention, the bicycle pedal of the first aspect further comprises a biasing member adjustment mechanism coupled between the first cleat securing member and the first biasing member to adjust the biasing force applied to the first cleat securing member from the first biasing member.

In accordance with a tenth aspect of the present invention, the bicycle pedal of the first aspect further comprises a second cleat securing member coupled to the main pedal body at a location spaced from the first cleat securing member to define a cleat receiving area between the first and second cleat securing members.

In accordance with an eleventh aspect of the present invention, the bicycle pedal of the first aspect further comprises an additional first cleat securing member, an additional sub member and at least an additional first biasing member. The additional first cleat securing member is pivotally coupled relative to the main pedal body about an additional first pivot axis between an additional first position and an additional second position. The additional sub member is pivotally coupled to the main pedal body to move about an additional second pivot axis, the additional second pivot axis being farther from the pedal axle than the additional first pivot axis. The additional first biasing member is disposed on the additional second pivot axis. The additional first biasing member is operatively disposed between the main pedal body and the additional first cleat securing member to bias the additional first cleat securing member toward the additional first position. The additional first cleat securing member, the additional sub member, the additional first biasing member and the additional first and second pivot axes are arranged relative to the main pedal body so that the additional first cleat securing member and the additional sub member rotate together about the additional second pivot axis until the additional sub member abuts against the main pedal body, and the additional first cleat securing member subsequently rotates toward the additional second position about the additional first pivot axis independently from the additional sub member during a step-in operation. The first cleat securing member has a first cleat engagement surface. The sub member including a second cleat securing member. The second cleat securing member has a second cleat engagement surface. The additional first cleat securing member has an additional first cleat engagement surface. The additional sub member includes an additional second cleat securing member. The additional second cleat securing member having an additional second cleat engagement surface.

Other objects, features, aspects and advantages of the disclosed bicycle pedal will become apparent to those skilled in the art from the following detailed description, which, taken in conjunction with the annexed drawings, discloses preferred embodiments of the bicycle pedal.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
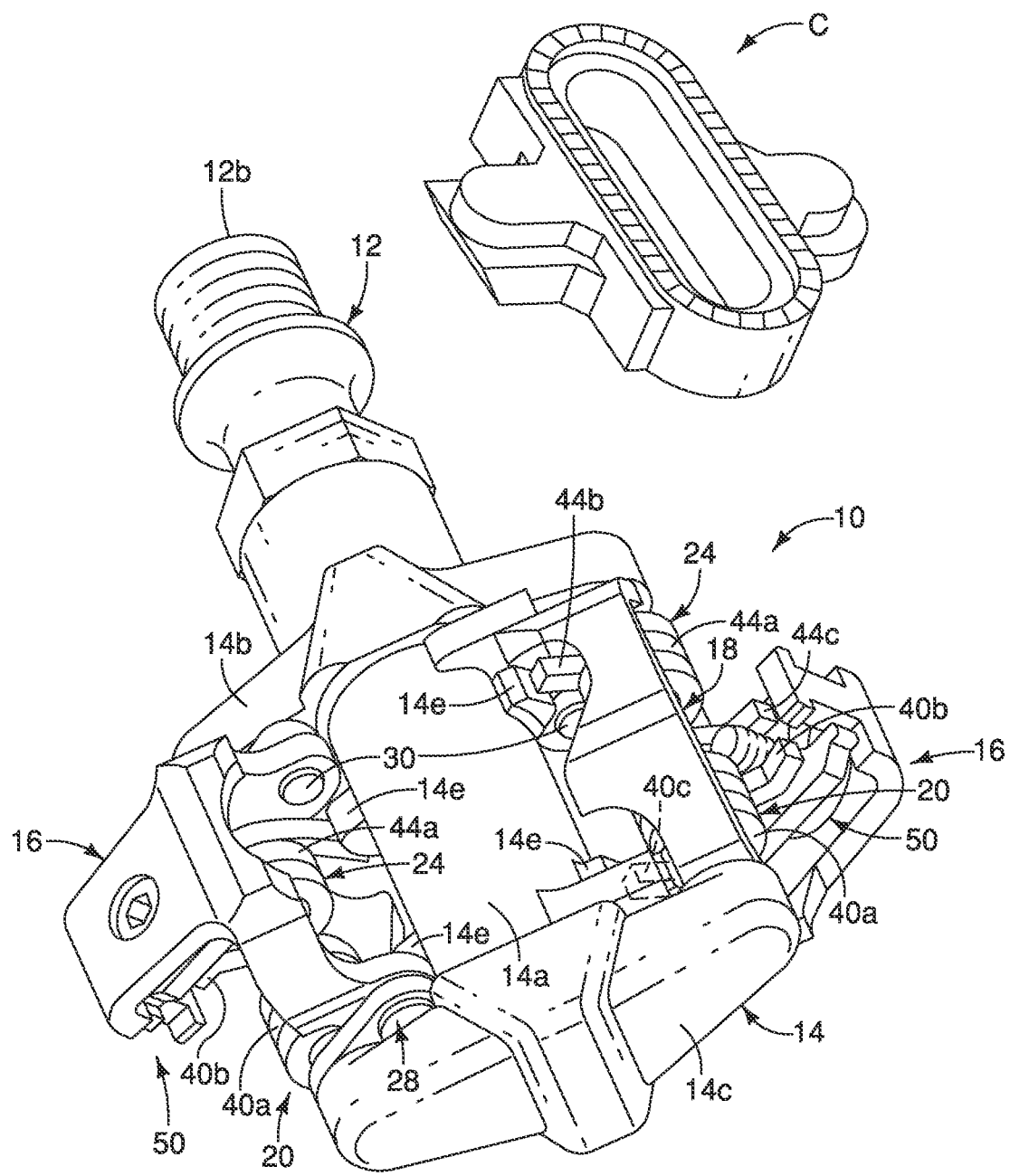
FIG. 1 is a perspective view of a bicycle pedal in accordance with a first embodiment.
Figure 2:
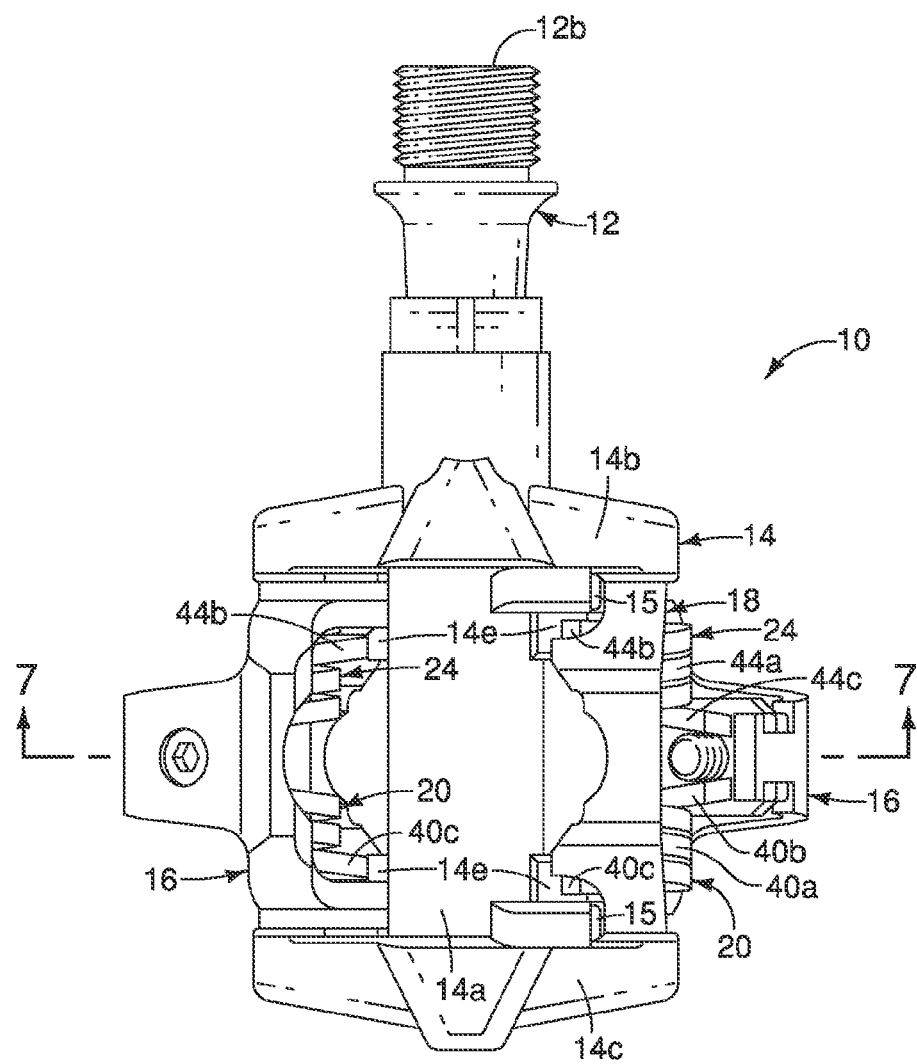
FIG. 2 is a top plan view of the bicycle pedal illustrated in FIG. 1.
Figure 3:
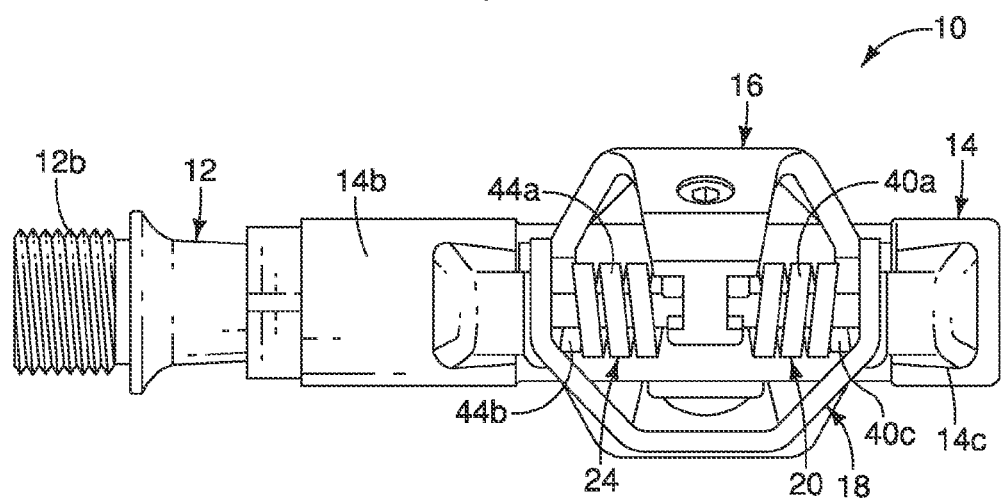
FIG. 3 is a rear end elevational view of the bicycle pedal illustrated in FIGS. 1 and 2.
Figure 4:
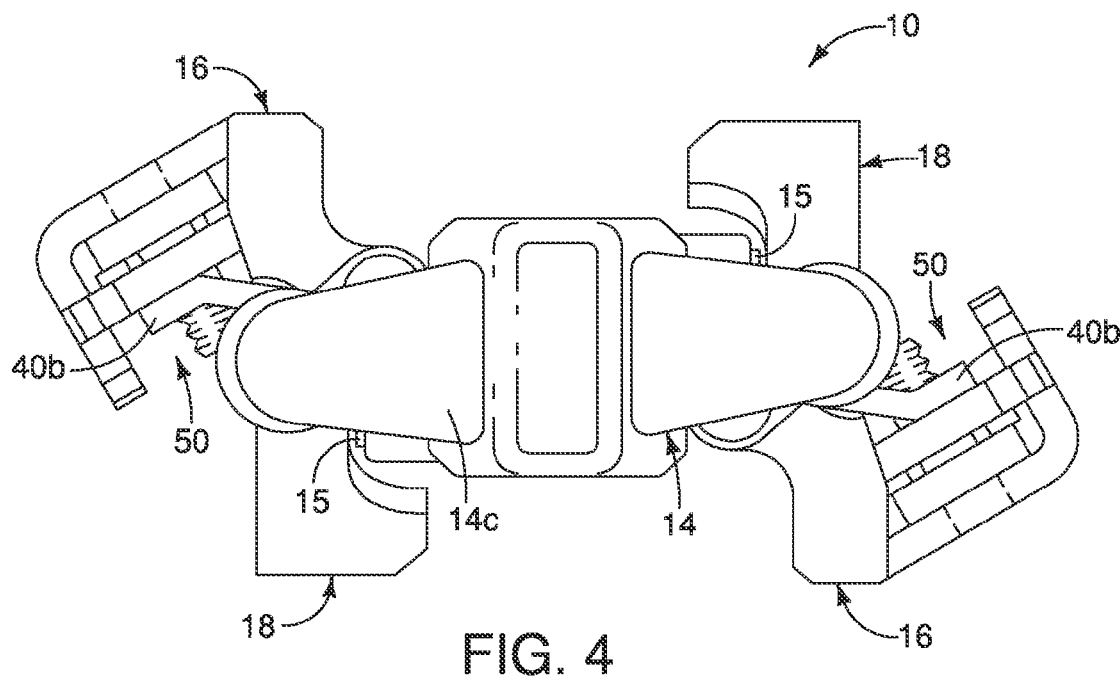
FIG. 4 is an outside elevational view of the bicycle pedal illustrated in FIGS. 1-3.
Figure 5:
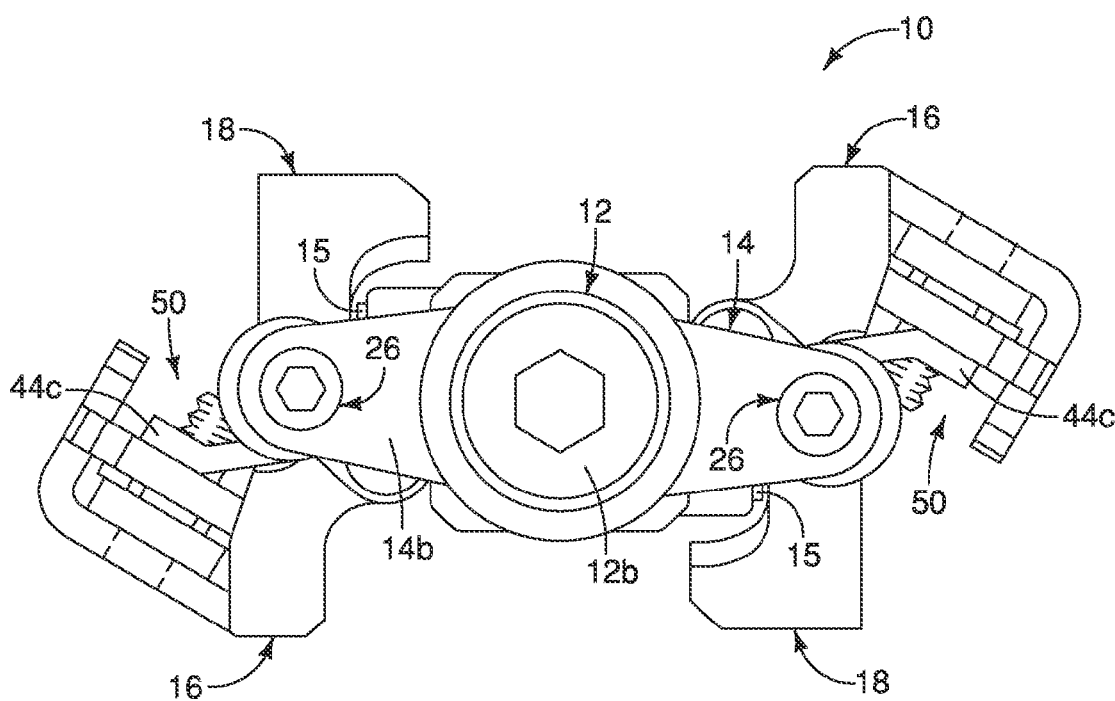
FIG. 5 is an inside elevational view of the bicycle pedal illustrated in FIGS. 1-4.

Referring initially to FIG. 1, a bicycle pedal 10 is illustrated in accordance with a first embodiment. In the illustrated embodiment, the bicycle pedal 10 is a two-sided (e.g. mountain bicycle style) bicycle pedal that basically includes a pedal axle 12, a main pedal body 14, a pair of first cleat securing members 16, a pair of a sub members 18, and a pair of first biasing members 20. One of the first cleat securing members 16, one of the sub members 18 and one of the first biasing members 20 is mounted at each longitudinal end of the main pedal body 14. The first biasing members 20 bias the first cleat securing members 16 toward clamping positions (first positions).

In the illustrated embodiment, the first cleat securing member 16 is preferably a rear cleat securing member, while a part of the sub member 18 at the opposite end of the main pedal body preferably forms a (front) second cleat securing member. Likewise, on the opposite side of the pedal 10, the other first cleat securing member 16 is preferably another rear cleat securing member while a part of the other sub member 18 preferably forms another (front) second cleat securing member. Therefore, in the illustrated embodiment, each of the sub members not only support and cooperate with one of the first cleat securing members 16, but also act as the (front) second cleat securing member on the opposite side of the pedal 10, as explained in more detail below. In the case of a one-sided pedal (e.g. road style), the pedal 10 would be modified to only include one of the first cleat securing members 16, one of the sub members 18 and one of the first biasing members 20 at one longitudinal end of the main pedal body 14. At the other longitudinal end of the main pedal body 14, a conventional fixed (front) second cleat securing member would be provided in accordance with U.S. patent application Ser. No. 13/665,371, assigned to Shimano Inc. With such a pedal, only one-side would be engageable with the bicycle cleat C.

Referring to FIGS. 1-5, one of the first cleat securing members 16, one of the sub members 18 and one of the first biasing members 20 at one longitudinal end of the main pedal body 14 will now be described. The descriptions of these parts also apply to the additional like parts at the other longitudinal end of the main pedal body 14.

The first cleat securing member 16 is a movable cleat securing member that is biased by a first biasing member 20. The sub member 18 pivotally supports the first cleat securing member 16. The sub member 18 is pivotally coupled to the main pedal body 14. The additional sub member 18 is coupled to the main pedal body 14 at a location spaced from the first cleat securing member 16, to both support the additional first cleat securing member and to define a cleat receiving area between the first cleat securing member 16 and the additional sub member 18. Another cleat receiving area is formed on the opposite side of the main pedal body 14 between the sub member 18 and the additional first cleat securing member 16 at the other end.

Referring to FIGS. 1-7, the pedal axle 12 includes a pedal support end. 12a and an attachment end 12b. The main pedal body 14 is rotatably supported on pedal axle 12. Preferably, the main pedal body 14 is rotatably supported on the pedal support end 12a of the pedal axle 12 via bearings or the like in a conventional manner. The main pedal body 14 includes a transverse axle portion 14a, a longitudinally extending inner side portion 14b and a longitudinally extending outer side portion 14c. The axle portion 14a is rotatably supported on the pedal support end 12a of the pedal axle 12. The inner side portion 14b is fixed to the end of the axle portion 14a that is closest to the attachment end 12b of the pedal axle 12. The outer side portion 14c is fixed to the opposite end of the axle portion 14a.

Therefore, the main pedal body 14 is preferably an H-shaped member. The main pedal body 14 is constructed of lightweight rigid material (e.g., a metallic material). In the illustrated embodiment, the axle portion 14a, the inner side portion 14b and the outer side portion 14c are integrally formed together as a one-piece, unitary member. Due to the H-shaped configuration of the main pedal body 14 mounting spaces are provided at opposite longitudinal ends of the main pedal body 14 for mounting the first and second cleat securing members 16 and 18 therein, as explained below.

Referring now to FIGS. 1-7, 13 and 14, the main pedal body 14 includes a plurality of abutment members 15 attached thereto to limit the amount of pivotal movement of the sub members 18. In the illustrated embodiment, the abutment members 15 are pins that are press-fitted into holes 14d formed in protruding parts of the axle portion 14a as best understood from FIGS. 13-14. Thus, the abutment members are coupled to the main pedal body 14 in a press-fit manner. Therefore, in the illustrated embodiment, the abutment members 15 are separate members from the main pedal body 14 that are non-movably fixed to the main pedal body 14 to form parts of the main pedal body 14. The amount of pivotal movement of the sub members 18 is determined by the length of the abutment members 15.

Thus it will be apparent to those skilled in the art from this disclosure that different lengths of abutment members 15 could be used to adjust the amount of pivotal movement of the sub members 18 if needed and/or desired. Alternatively, it wilt be apparent to those skilled in the art from this disclosure that modified abutment members can be adjustably attached to the main pedal body 14 to make pivotal movement of the sub members 18 adjustable, as discussed below with reference to an alternate main pedal body illustrated in FIGS. 19-20. In addition, it will be apparent to those skilled in the art from this disclosure that the abutment members 15 can be integrally formed with the main pedal body 14 to allow a predetermined (fixed) amount of pivotal movement of the sub members 18, i.e., no adjustment if desired. Further, it will be apparent to those skilled in the art from this disclosure that separate abutment members 15 can also be attached to the sub member 18 instead of the main pedal body 14, or to both of the sub member 18 and the main pedal body 14.

Figure 7:
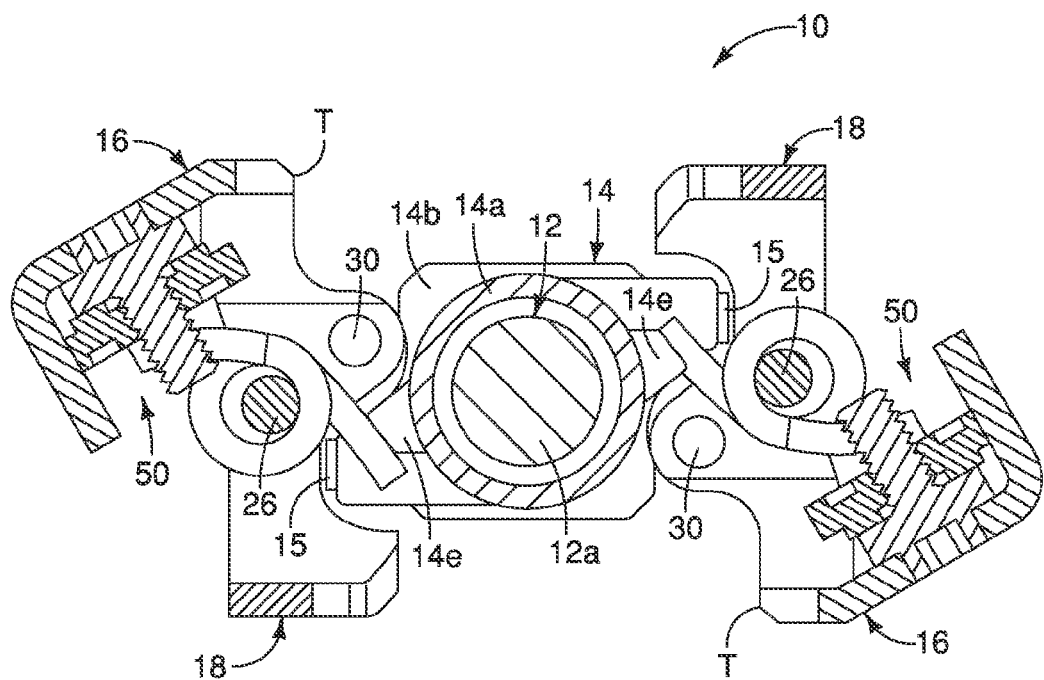
FIG. 7 is a cross-sectional view of the bicycle pedal illustrated in FIGS. 1-6, as viewed along section line 7-7 of FIG. 2, with the first cleat securing member in a first position and the sub member in a first position.
Figure 8:
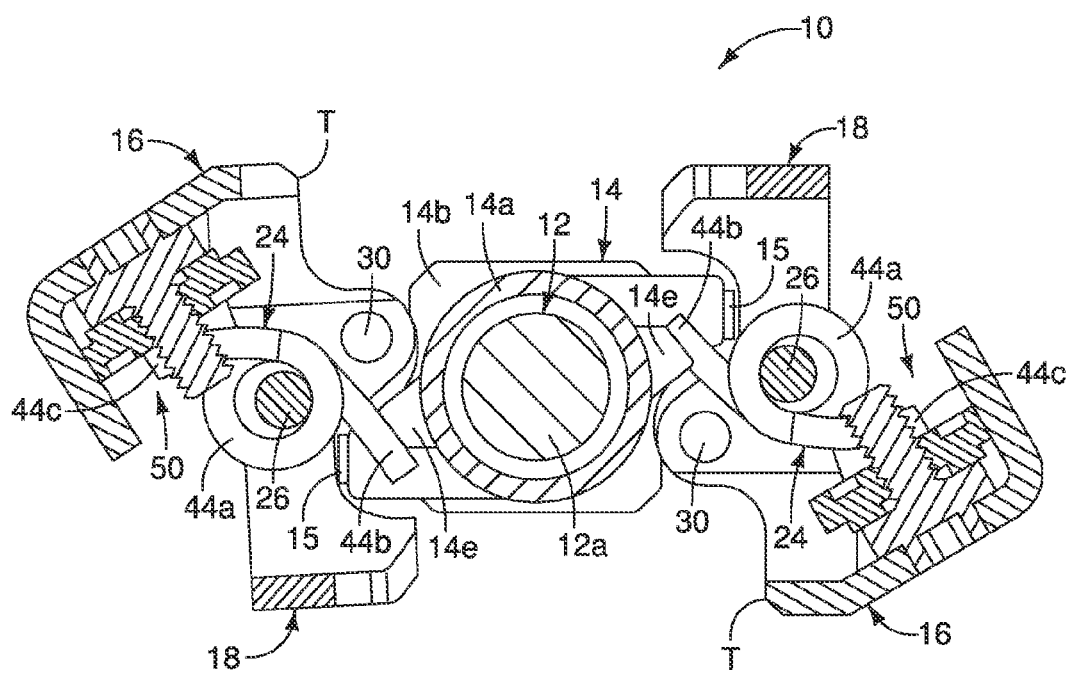
FIG. 8 is a cross-sectional view of the bicycle pedal illustrated in FIGS. 1-6, as viewed along section line 7-7 of FIG. 2, with the first cleat securing member moved to an intermediate position and the sub member moved to a second position.
Figure 9:
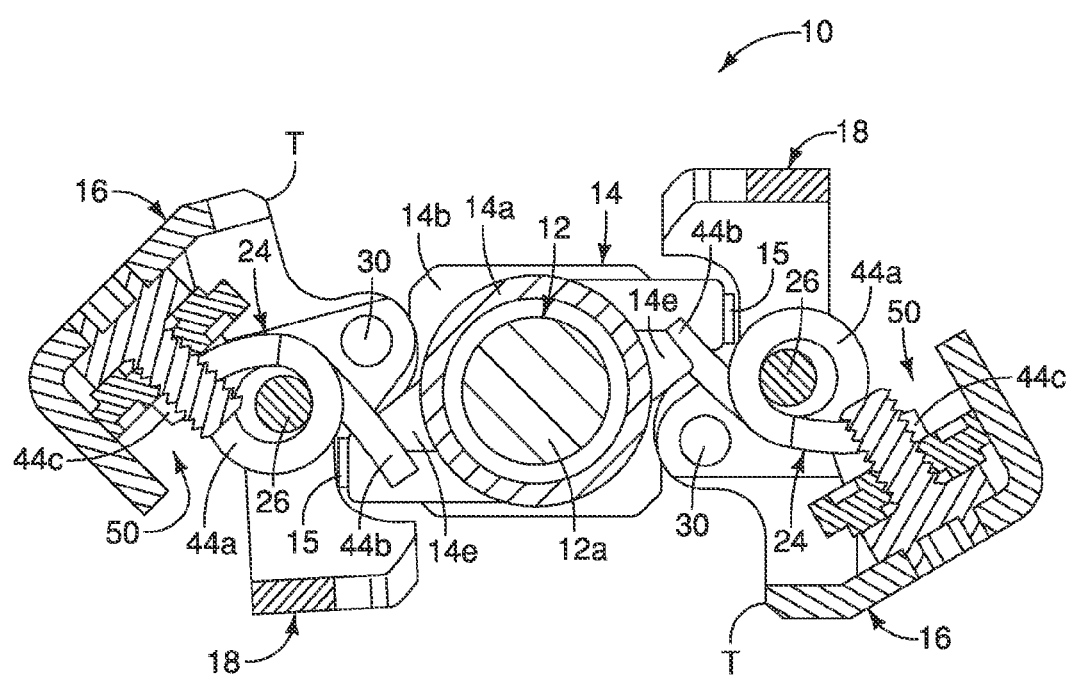
FIG. 9 is a cross-sectional view of the bicycle pedal illustrated in FIGS. 1-6, as viewed along section line 7-7 of FIG. 2, with the first cleat securing member moved from the intermediate position to a second position, with the sub member remaining in the second position.

Referring to FIGS. 1-9, the first cleat securing member 16 is movably coupled relative to the main pedal body 14 about a first pivot axis X between a first (clamping) position and a second (release) position. Preferably, the first cleat securing member 16 is pivotally coupled relative to the main pedal body 14 about a first pivot axis X between a first (clamping) position (FIGS. 4 to 7) and a second (release) position (FIG. 9). Also an intermediate (step-in) position (FIG. 8) occurs between the first position and the second position when the first cleat securing member 16 is partially pivoted towards the second position. The first biasing member 20 biases the first cleat securing member 16 toward the first position. The first biasing member 20 is supported on the main pedal body 14 at a distance farther from a center longitudinal axis A of the pedal axle 12 than the first pivot axis X. The first biasing member 20 preferably includes at least one first torsion spring.

In this embodiment, each longitudinal end of the bicycle pedal 10 also preferably includes a second biasing member 24 and a support shaft 26, which are used in conjunction with one of the first cleat securing members 16 and one of the sub members 18. For the sake of convenience only the parts coupled at one longitudinal; end of the main pedal body 14 will be discussed. The sub-member 18 is mounted on the main pedal body 14 by the support shaft 26. In this embodiment, the sub member 18 is movably coupled to the main pedal body 14 for movement between a first position (FIGS. 4-7) and a second position (FIG. 8). The sub member 18 is preferably pivotally mounted on the main pedal body 14 using the support shaft 26 as a pivot axle. The support shaft 26 defines a second pivot axis Y that is offset from the first pivot axis X. Thus, the sub member 18 is pivotally coupled to the main pedal body 14 about the second pivot axis Y.

Referring still to FIGS. 1-9, the first cleat securing member 16 is pivotally mounted on the sub member 18 about the first pivot axis X. Preferably, the first cleat securing member 16 is pivotally mounted to the sub member 18 using a pivot axle 28.

In the illustrated embodiment, the pivot axle 28 includes two pivot pins 30 (i.e., two separate axles) for the purpose of weight-saving. However, a single axle (not shown) can be used. In terms of removal of mud removal, two separate axles are also more advantageous than a single axle. However, in comparison with the conventional structure, a single first pivot axle is still advantageous in terms of removal of mud because no biasing members are disposed on the pivot axle 28. In other words, the first and second biasing members 20 and 24 are not mounted on the pivot axle 28, but are mounted on the support shaft 26 disposed farther from the center longitudinal axis A of the pedal axle 12 than the pivot axle 28.

The support shaft 26 supports the first biasing member 20 on the main pedal body 14. The first biasing member 20 biases the first cleat securing member 16 toward the first position relative to the main pedal body 14. The support shaft 26 extends through a coiled portion of the at least one first torsion spring. Since the sub member 18 is pivotally coupled to the main pedal body, the first pivot axis X moves when the sub member 18 moves about the second pivot axis Y. The second pivot axis Y is positioned at a distance farther from a center longitudinal axis A of the pedal axle 12 than the first pivot axis X. The support shaft 26 is threadedly attached to the main pedal body 14 as best understood from FIGS. 11-14.

The second biasing member 24 is supported on the main pedal body 14 by the support shaft 26. The second biasing member 24 also biases the first cleat securing member 26 toward the first position relative to the main pedal body 14. The second biasing member 24 preferably includes at least one second torsion spring. The support shaft 26 also extends through a coiled portion of the at least one second torsion spring. Therefore, the support shaft 26 supports the first and second biasing members 20 and 24 on the main pedal body 14 at a distance farther from the center longitudinal axis A of the pedal axle 12 than the first pivot axis X.

In this embodiment, the sub member 18 is moved from the first position toward a second position as the first cleat securing member 16 moves from the first position toward the second position. In particular, the first cleat securing member 16 and the sub-member 18 rotate together until the sub-member 18 abuts against the abutment member 15 (two in the illustrated embodiment), and the first cleat securing member 16 subsequently rotates toward the second position independently from the sub-member 18 during a step-in operation, as explained in more detail below. Due to the locations of the pivot axes X and Y relative to each other and relative to the tip T of the first cleat securing member 16, the biasing forces from the first and second biasing members 20 and 24 applied to the first cleat securing member 16 also act on the sub member 18 to bias the sub member from the position shown in FIG. 8 to the position shown in FIG. 7. In other words, part of the sub member 18 between the pivot axes X and V is a lever arm to which the biasing force applied to the first cleat securing member 16 is also applied. The intermediate position of the first cleat securing member 16 occurs at the point that the first cleat securing member 16 first moves relative to the sub member 18, i.e., when the sub member 18 contacts the abutments 15 to stop pivotal movement of the sub member 18 (FIG. 8).

This intermediate position can correspond to the step-in position in which the first cleat securing member 16 moves toward the release position (the second position) just enough for the cleat C to be fully engaged with the first cleat securing member 16 during a step-in engagement by the rider. Alternatively, the step-in position can be at a point prior to the first cleat securing member 16 moving relative to the sub member 18. In any case, preferably, the step-in position occurs before the first cleat securing member 16 pivots about the first pivot axis X, which is closer to the tip T of the first cleat securing member 16 than the second pivot axis Y. At this point, because the tip T of the first cleat securing member 16 is closer to the first pivot axis X than the second pivot axis Y, a shorter lever arm (less mechanical advantage) is provided for moving the first cleat securing member 16 relative to the sub member 18 than for moving both the first cleat securing member 16 and the sub member 18 about the second pivot axis Y. Therefore the biasing force applied to the first cleat securing member 16 from the first and second biasing members 20 and 24 is effectively higher once the sub member 18 contacts the abutment members 15 (once the first cleat securing member 16 begins to rotate about the first pivot axis X). The first cleat securing member 16 pivots further during a release operation (FIG. 9) than in a step in operation (FIG. 8). Therefore this higher effective biasing force is applied to the first cleat securing member 16 during a releasing operation.

The first cleat securing member 16, the first biasing member 20 the sub member 18, the second biasing member 24, the support shaft 26 and the pivot axle 28 will now be explained in more detail.

Figure 6:
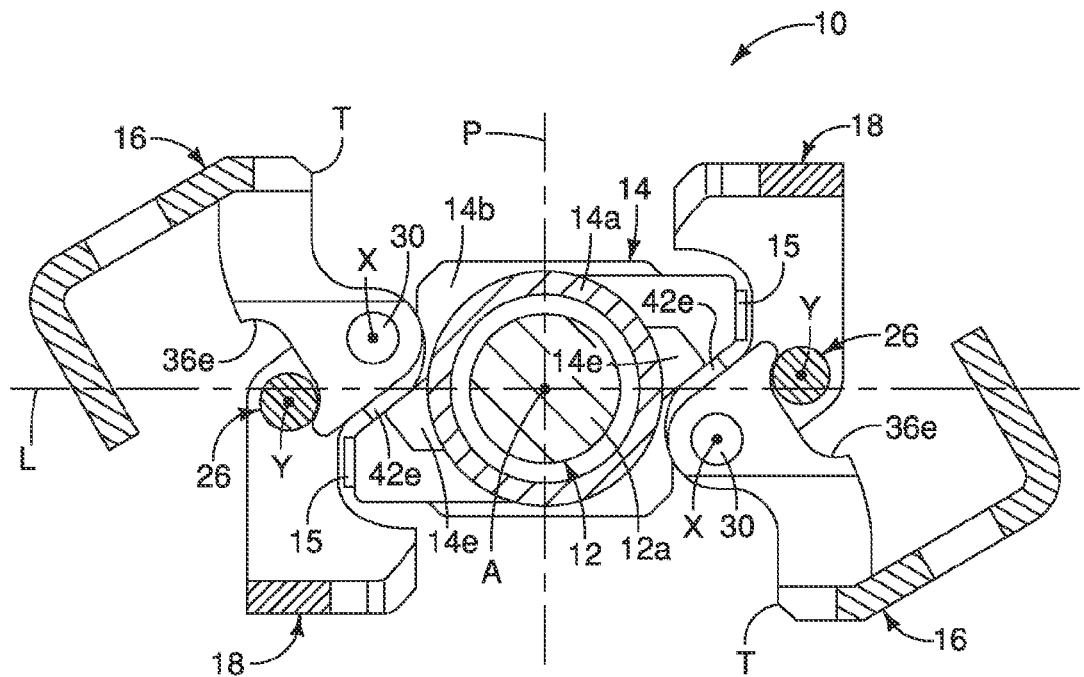
FIG. 6 is an outside elevational view of the bicycle pedal illustrated in FIGS. 1-5, with portions broken away for the purpose of illustration, and with the biasing members and adjustment mechanisms removed for the purpose of illustration.

Referring to FIGS. 1-12, 17 and 18, the first cleat securing member 16 is constructed of a lightweight rigid material. The first cleat securing member 16 basically includes a cleat securing portion 36*a*, an inner attachment portion 36*b*, an outer attachment portion 36*c* and a projecting portion 36*d*. The cleat securing portion 36*a*, the inner attachment portion 36*b*, the outer attachment portion 36*c* and the projecting portion 36*d* are preferably fixed together to move as one unit. In the illustrated embodiment, the cleat securing portion 36*a*, the inner attachment portion 36*b*, the outer attachment portion 36*c* and the projecting portion 36*d* are preferably integrally formed together as a one-piece unitary member. The inner and outer attachment portions 36*b* and 36*c* preferably include cutouts 36*e*, which are sized and configured to contact the support shaft 26 in the first (clamping) position (as shown in FIG. 6), and in the release position or at a position beyond the release position (not shown).

The projecting portion 36*d* has a hole configured to receive part of a biasing member (tension) adjustment mechanism 50. The biasing member adjustment mechanism 50 is coupled between the first cleat securing member 16 and the first biasing member 20 (and the second biasing member 24) to adjust the biasing force applied to the first cleat securing member 16 from the first biasing member 20 (and the second biasing member 24). The adjustment mechanism 50 is preferably constructed in accordance with U.S. Pat. No. 6,446,529, assigned to Shimano Inc., except the free end of projecting portion terminates in a T-Shape and the adjustment mechanism 50 has a modified shape of plate member to be retained on the first cleat securing member 16. The first and second biasing members 20 and 24 engage the adjustment mechanism 50 to adjustably bias the first cleat securing member 116 toward the clamping position. The cleat securing portion 36*a* includes a pair of cleat engagement surfaces 36*f*. Thus, the first cleat securing member 16 has a first cleat engagement surface 36*f* located farther from the second pivot axis Y than the first pivot axis X.

The cleat securing portion 36*a* is disposed between the inner attachment portion 36*b* and the outer attachment portion 36*c* to form a shallow U-shaped profile. The cleat securing portion 36*a* is contacted by the bicycle cleat C to move during step-in and release from the bicycle pedal 10. The cleat securing portion 36*a* (cleat engagement surfaces 36*f*) also contacts the bicycle cleat C to couple the bicycle cleat C to the pedal 10. The inner attachment portion 36*b* and the outer attachment portion 36c are pivotally coupled to the sub member 18 using the first pivot axle 28 (e.g. pivot pins 30). The projecting portion 36d projects rearward and downward in a substantially L-shaped configuration from the cleat securing portion 36a when the pedal 10 is in a normal riding (horizontal) orientation. See the left side of FIG. 4 for example.

As mentioned above, the first biasing member 20 preferably includes a torsion spring. In the illustrated embodiment, the torsion spring includes a coiled portion 40a, an inner end portion 40b and an outer end portion 40c. The support shaft 26 extends through the coiled portion 40a. The inner end portion 40b extends from the coiled portion 40a and engages the adjustment mechanism 50 of the first cleat securing member 16. The outer end portion 40c engages an abutment 14e of the axle portion 14a of the main pedal body 14 as seen and/or understood from FIGS. 1, 2, 6-9 and 13-14. Thus, the first biasing member 20 biases the first cleat securing member 16 toward the first (clamping) position from the second (release) position. The first biasing member 20 is disposed on the outer part of the support shaft 26, i.e., the part closest to the outer longitudinal side 14c of the main pedal body 14.

Referring to FIGS. 1-12, 15 and 16, the sub member 18 is also constructed of a lightweight rigid material. The sub member 18 basically includes a central portion 42a, an inner attachment portion 42b and an outer attachment portion 42c. The central portion 42a, the inner attachment portion 42b and the outer attachment portion 42.c are preferably fixed together to move as one unit. In the illustrated embodiment, the central portion 42a, the inner attachment portion 42b and the outer attachment portion 42c are preferably integrally formed together as a one-piece unitary member.

The central portion 42a is disposed between the inner attachment portion 42b and the outer attachment portion 42c to form a shallow U-shaped profile. The inner attachment portion 42b and the outer attachment portion 42c are pivotally coupled to the inner and outer longitudinal sides 14h and 14c of the main pedal body via the support shaft 26.

The central portion 42a is shaped to form a second cleat securing member on the opposite side of the main pedal body 14. The central portion 42a further includes a second (front) cleat engagement surface 42d. Thus, the sub member 18 includes a second cleat securing member 42a that has a second cleat engagement surface 42d. Likewise, the additional sub member 18 at the opposite longitudinal end of the main pedal body 14 also includes a second cleat securing member (central portion 42a). Therefore, the pedal 10 preferably further includes a second cleat securing member coupled to the main pedal body 14 at a location spaced from the first cleat securing member 16 to define a cleat receiving area between the first and second cleat securing members. The inner and outer attachment portions 42b and 42c include tabs 42e to contact another part of the pedal 10 in the clamping position so that the sub member 18 will not rotate counter-clockwise beyond the clamping position (see FIGS. 6, 15 and 16). In the illustrated embodiment, the tabs 42e contact opposed surface of the main pedal body 14 disposed at the same end of the main pedal body 14.

As mentioned above, the second biasing member 24 preferably includes a torsion spring. In the illustrated embodiment, the torsion spring includes a coiled portion 44a, an inner end portion 44b and an outer end portion 44c. The support shaft 26 extends through the coiled portion 44a. The outer end 44c extends from the coiled portion 44a and engages the adjustment mechanism 50 of the first cleat securing member 16. The inner end 44b engages the abutment 14e of the axle portion 14a of the main pedal body 14. Thus, the second biasing member 24 biases the first cleat securing member 16 toward the first position. The second biasing member 40 is disposed on the inner part of the support shaft 26, i.e., the part closest to the inner longitudinal side 14b of the main pedal body 14.

Referring to FIG. 6, the locations of the first and second pivot axes X and Y relative to the center longitudinal axis A of the pedal axle 12 will now be explained in more detail. A longitudinal plane L passes through the center longitudinal axis A at identical locations at both longitudinal ends of the pedal 10 to bisect the pedal 10 into like (upper and lower) halves. Similarly, a cross plane P, perpendicular to the longitudinal plane L, passes through the center longitudinal axis A at identical (upper and lower) locations of the pedal 10. The first pivot axis X is closer the plane P than the second pivot axis Y. However, the first pivot axis X is further from the plane L than the second pivot axis Y. Also, the first and second pivot axes X and Y are disposed in different quadrants, of the four quadrants formed by the intersection of the planes L and P. In the illustrated embodiment, the second pivot axis Y is located about 1.5 times further from the P than the first pivot axis X, and the second pivot axis X is located about three times further from the plane L than the first pivot axis Y.

Referring now to FIGS. 7-10, step in and release from the bicycle pedal 10 will now be explained in more detail.

Figure 10:
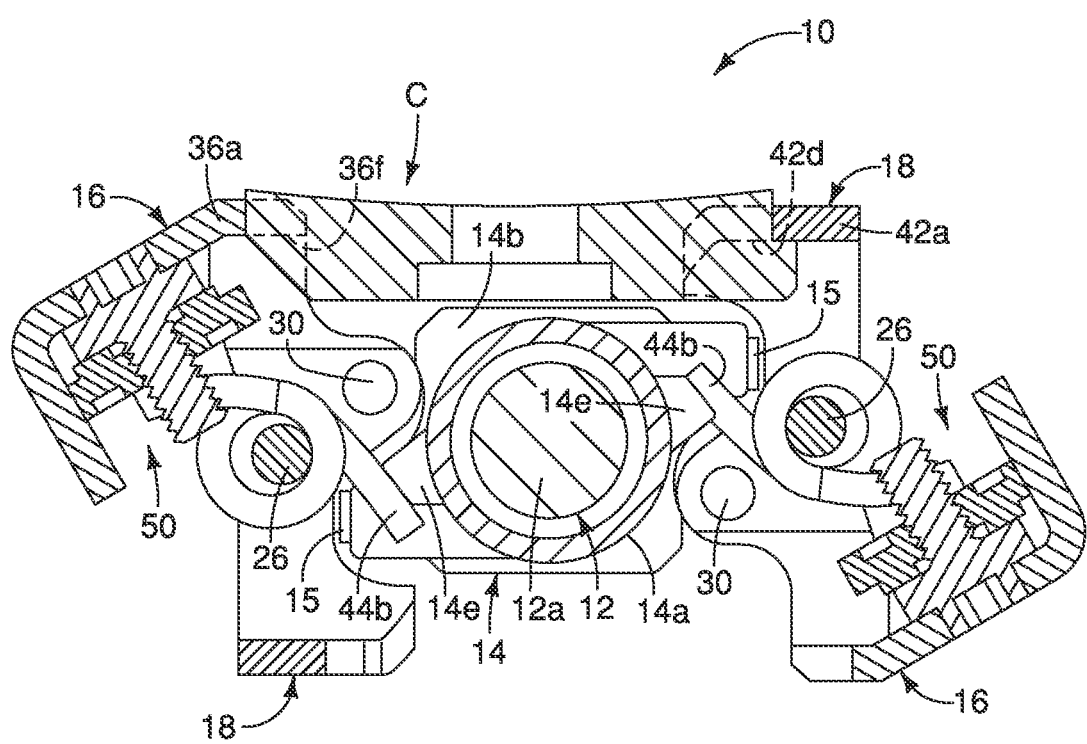
FIG. 10 is a cross-sectional view of the bicycle pedal illustrated in FIGS. 1-6, as viewed along section line 7-7 of FIG. 2, with the first cleat securing member in a first position and the sub member in a first position and with the cleat coupled thereto.
Figure 11:
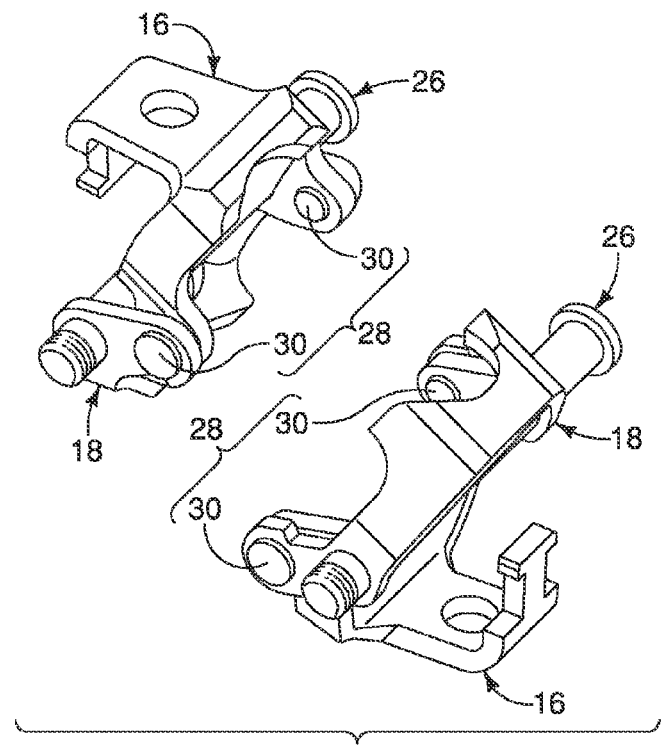
FIG. 11 is perspective view of the first cleat securing member and sub member assemblies separated from the main pedal body, with the biasing members and adjustment mechanisms removed for the purpose of illustration.
Figure 12:
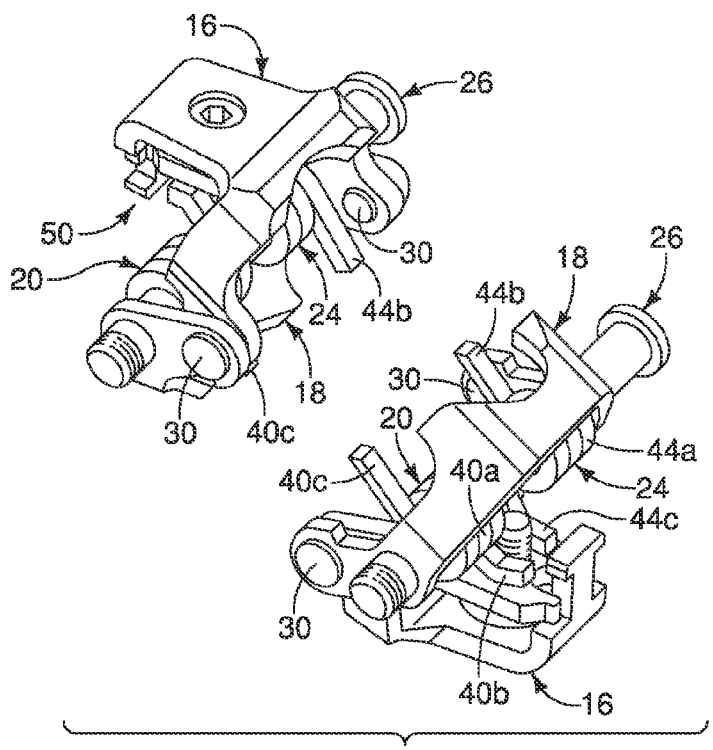
FIG. 12 is perspective view of the first cleat securing member and sub member assemblies separated from the main pedal body, with the biasing members and adjustment mechanisms attached for the purpose of illustration.
Figure 13:
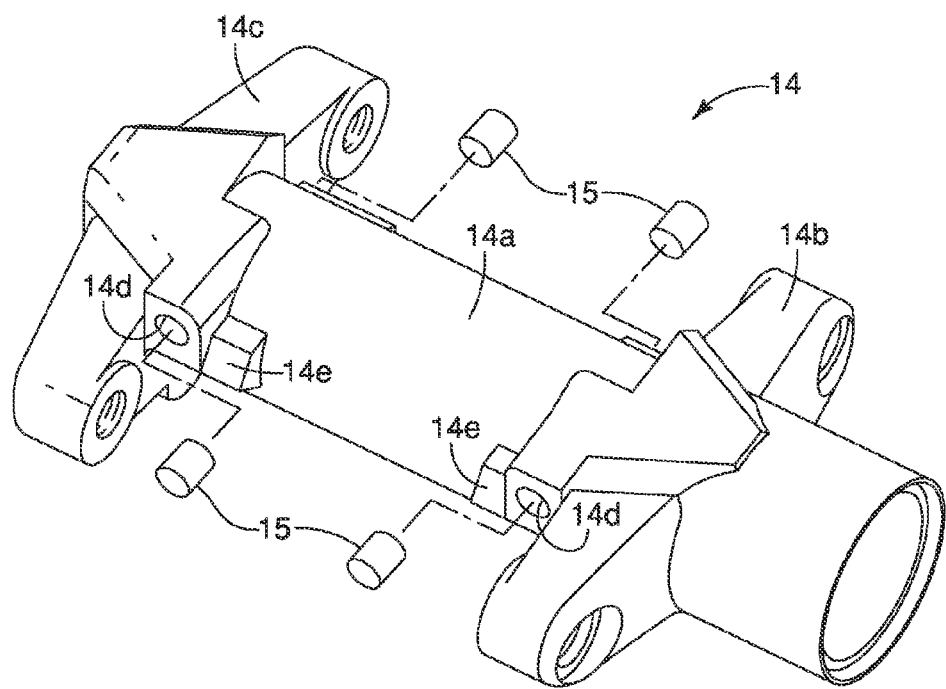
FIG. 13 is an inside perspective view of the main pedal body of the bicycle pedal illustrated in FIGS. 1-10.
Figure 14:
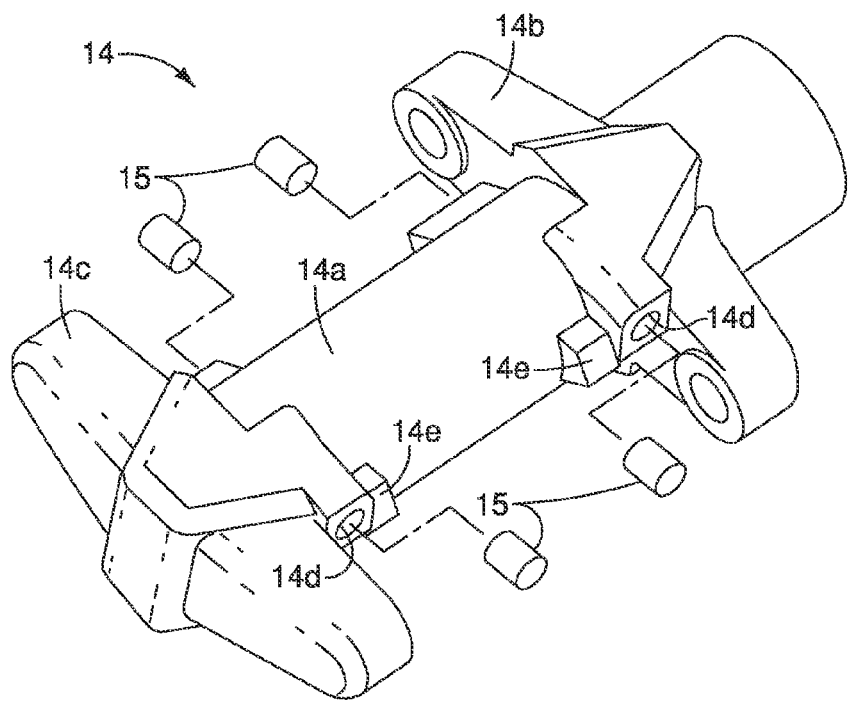
FIG. 14 is an outside perspective view of the main pedal body of the bicycle pedal illustrated in FIGS. 1-10.
Figure 15:
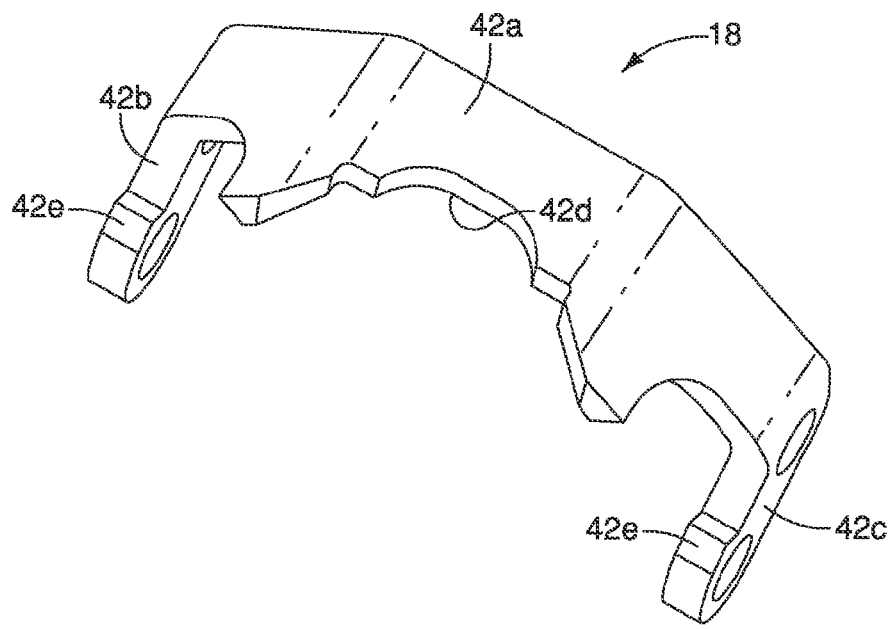
FIG. 15 is an upper perspective view of one of the sub members of the bicycle pedal illustrated in FIGS. 1-10.
Figure 16:
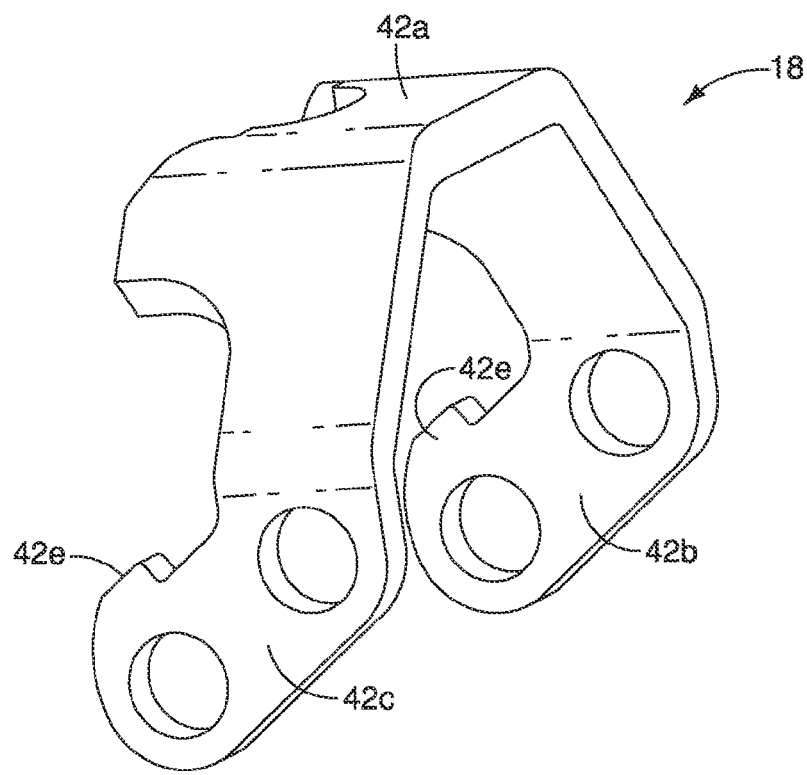
FIG. 16 is a side perspective view of one of the sub members of the bicycle pedal illustrated in FIGS. 1-10.
Figure 17:
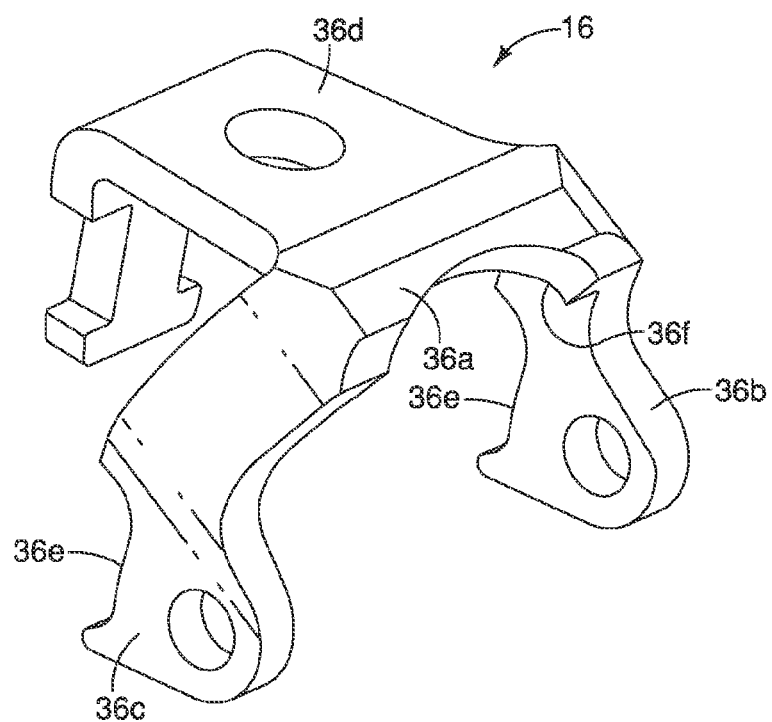
FIG. 17 is an upper perspective view of one of the first cleat securing members of the bicycle pedal illustrated in FIGS. 1-10.
Figure 18:
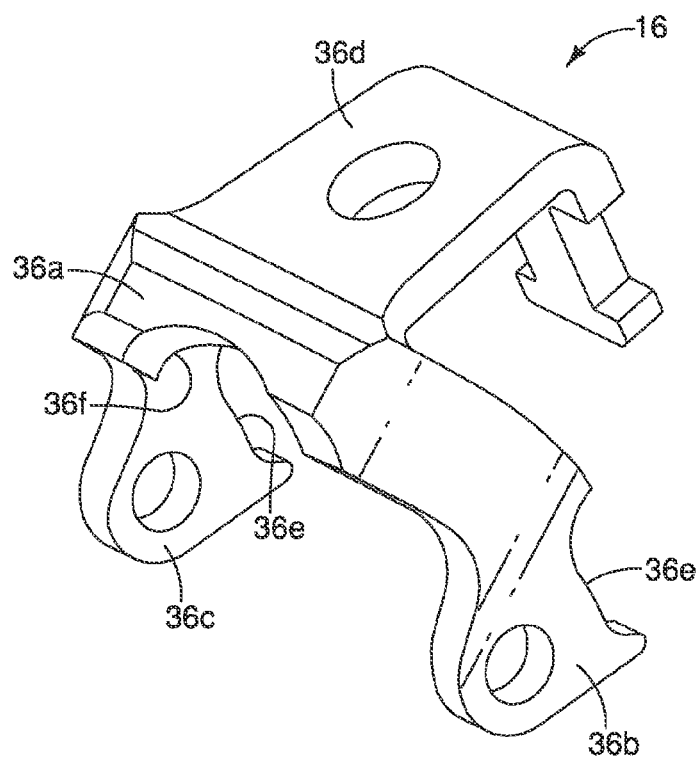
FIG. 18 is a reversed perspective view of one of the first cleat securing members of the bicycle pedal illustrated in FIGS. 1-10.

During a step-in operation (an operation where the rider clips the cleat of the shoe into the pedal 10), the first cleat securing member 16 and the sub member 18 pivotally rotate together around the second pivot axis Y against the first biasing force of the first and second biasing members 20 and 24 until the sub member 18 contacts the abutment members 15 of the main pedal body 14. This operation is shown in FIGS. 7-8. In FIG. 7, the first (clamping) position of the first cleat securing member 16 is shown. When the rider steps into the pedal 10, the first cleat securing member 16 and the sub member 18 move together from the position shown in FIG. 7 to the intermediate position shown in FIG. 8 against the first biasing force of the first and second biasing members 20 and 24. When the first cleat securing member 16 is in the intermediate position, the sub member 18 contacts the abutments 15 to prevent further rotation of the sub member 18 as shown in FIG. 8. The intermediate position of FIG. 8 preferably corresponds to the step-in position where the cleat C of the shoe can move under the first cleat securing member 16. Then the first cleat securing member 16 will move back to the clamping position shown in FIG. 7 due to the biasing force of the first and second biasing members 20 and 24 to secure the cleat C as shown in FIG. 10. Preferably, the abutments 15 are sized and the sub member 18 is shaped so that step-in is permitted at the point of contact or before the point of contact between the sub member 18 and the abutments 15. For example, in FIG. 8, the sub member 18 and the first cleat securing member 16 have rotated about 3 degrees when contact with the abutments 15 is made. However, this amount of rotation before step in depends on the structure of the cleat C and the manner in which it is retained by the first cleat securing member 16. Thus, the amount of rotation of the first cleat securing member 16 and the sub member 18 together before contact with the abutment members 15 can be set to a suitable range, such as 1-10 degrees. During this step-in operation, the first cleat securing member 16 moves with the sub member 18 about the pivot axis Y due to the locations (spacing) of the pivot axes X an Y relative to the tip T of the first cleat securing member 16. Due to this arrangement, a relatively easy (light) step-in operation can be obtained.

During a release operation (an operation where the rider releases the cleat of the shoe from the pedal 10), the rider pushes the heel of the shoe outward (twists the shoe) while the shoe is coupled to the pedal 10 in a conventional manner via the cleat C. When the heel of the shoe is pushed outward, the cleat C will first move (rotate) the first cleat securing member 16 and the sub member 18 about the second pivot axis Y from the first position shown in FIG. 7 to the intermediate position shown in FIG. 8 against the biasing force of the first and second biasing members 20 and 24. At this point, the sub member 18 contacts the abutment members 15 to prevent further rotation of the sub member 18. However, at this point, the first cleat securing member 16 has not moved enough to release the cleat C from the pedal 10 using a twisting motion of the cleat C. Rather, the first cleat securing member 16 continues to move (rotate) from the intermediate position shown in FIG. 8 to the second (release) position shown in FIG. 9 about the first pivot axis X against the biasing force of the first and second biasing members 20 and 24. In particular, additional force is required to move the first cleat securing member 16 from the intermediate position to the second position in which the cleat C can be released. Consequently, more force is required to release the cleat of the shoe from the pedal 10 than to step into the pedal 10. Once the first cleat securing member 16 reaches the release position shown in FIG. 9, the cleat C will be released from the first cleat securing member 16. Once the cleat C is released, the first cleat securing member 16 and the sub member 18 will return back to their original rest positions from the release position, due to the biasing forces of the first and second biasing members 20 and 24. Due to this arrangement, accidental disengagement of the cleat C from the bicycle pedal 10 can still be reduced during riding because the first and second biasing forces are exerted to engage the cleat C with the bicycle pedal 10.

Figure 19:
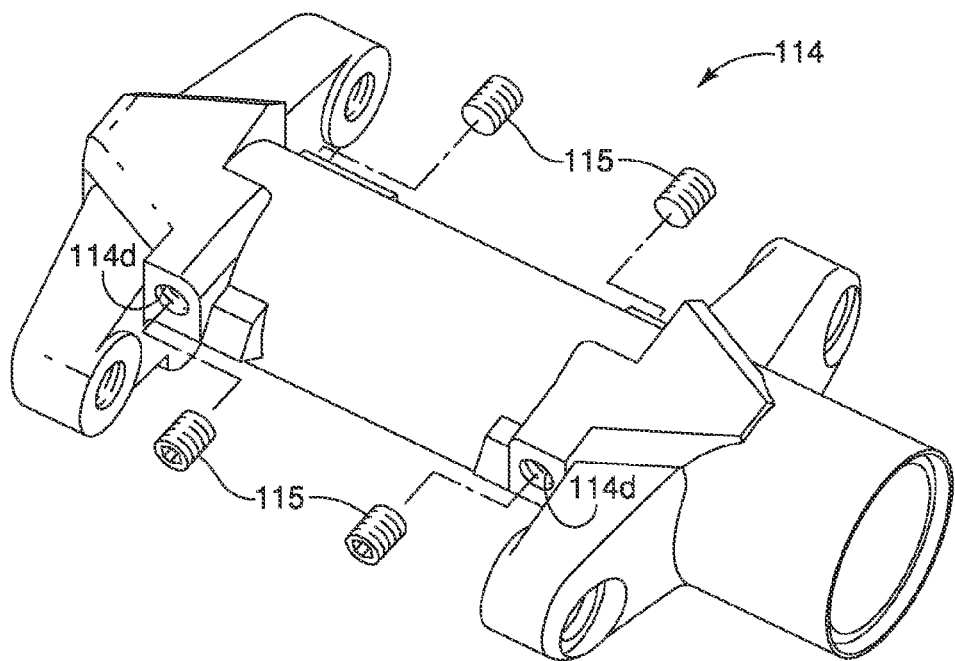
FIG. 19 is an inside perspective view of an alternate main pedal body of the bicycle pedal illustrated in FIGS. 1-10.
Figure 20:
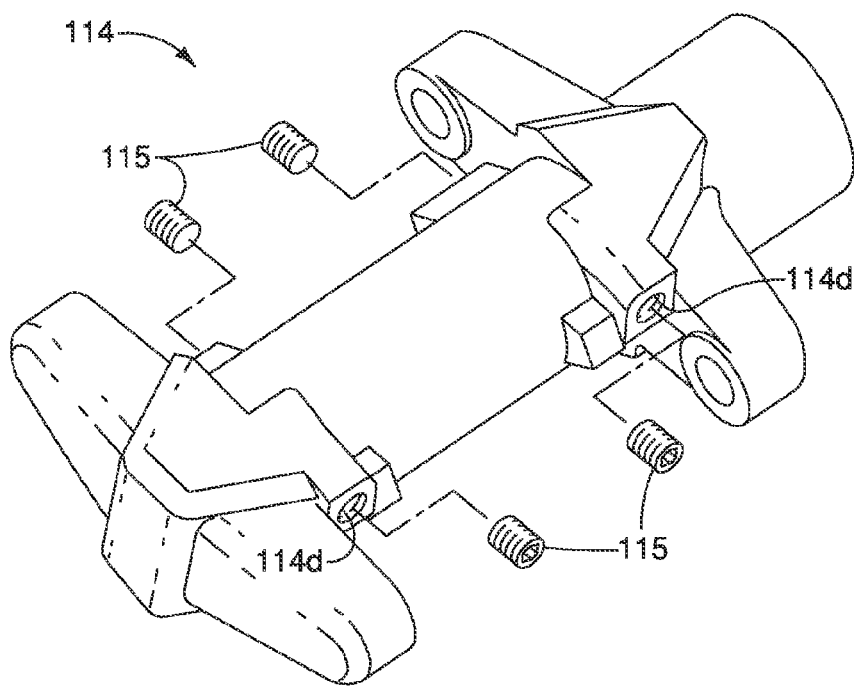
FIG. 20 is an outside perspective view of the alternate main pedal body illustrated in FIG. 19.

Referring now to FIGS. 19-20, an alternate main pedal body 114 will now be explained. The parts of the alternate main pedal body 114 that are identical to the parts of the main pedal body 14 will be given the same reference numerals. Moreover, the descriptions of the parts of the alternate main pedal body 114 that are identical to the parts of the main pedal body 14 may be omitted for the sake of brevity. In other words, the descriptions and illustrations of the main pedal body 14 also apply to this alternate main pedal body 114, except as explained and illustrated herein. Furthermore, it will be apparent from this disclosure that parts of this alternate main pedal body 114 that are identical or functionally identical will be given the same reference numerals as the main pedal body 14 but with "100" added thereto.

The alternate main pedal body 114 is identical to the main pedal body 14 described above and illustrated in FIGS. 1-18, except modified abutment members 115 are provided. In fact, when using the alternate main pedal body 114 in the bicycle pedal 10, there is no difference in the illustrations of FIGS. 1-12 and 15-18, unless the modified abutment members 115 are mounted in a different position than the abutment members 15. Therefore it will be apparent to those skilled in the art from this disclosure that the descriptions and illustrations of the bicycle pedal 10 using the main pedal body 14 also apply to a bicycle pedal 10 using the main pedal body 114, except for the modification described herein. The alternate main pedal body 114 utilizes threaded abutment members 115 that are threadedly mounted in threaded receiving holes 114*d* (i.e., instead of the press-fit arrangement of the main pedal body 14). Therefore, the abutment members 115 are adjustably coupled to the main pedal body 114 so that an amount of movement of the sub-member 18 before contacting the abutment members 115 is adjustable.

As explained above, according to the present invention including all the embodiments, the bicycle pedal 10 (e.g., in a one-sided pedal) preferably comprises a pedal axle 12, a main pedal body 14 rotatably supported on the pedal axle 12, a first cleat securing member 16, a sub member 18 and at least a first biasing member 20. The first cleat securing member 16 is pivotally coupled relative to the main pedal body 14 about a first pivot axis X between a first position and a second position. The sub member 18 is pivotally coupled to the main pedal body 14 to move about a second pivot axis Y. The second pivot axis Y is farther from the pedal axle 12 than the first pivot axis X. The first biasing member 20 is disposed on the second pivot axis Y. The first biasing member 20 is operatively disposed between the main pedal body 14 and the first cleat securing member 16 to bias the first cleat securing member 16 toward the first position. The first cleat securing member 16, the sub member 18, the first biasing member 20 and the first and second pivot axes X and Y are arranged relative to the main pedal body 14 so that the first cleat securing member 16 and the sub member 18 rotate together about the second pivot axis Y until the sub member 18 abuts against the main pedal body 14, and the first cleat securing member 16 subsequently rotates toward the second position about the first pivot axis X independently from the sub member 18 during a step-in operation. A second cleat securing member is preferably provided at the opposite longitudinal end of the main pedal body 14, as mentioned above.

In addition (e.g., in the case of a two sided pedal) the bicycle pedal 10 preferably further comprises an additional first cleat securing member 16, an additional sub member 18, and at least an additional first biasing member 20. The additional first cleat securing member 16 is pivotally coupled relative to the main pedal body 14 about an additional first pivot axis X between an additional first position and an additional second position. The additional sub member 18 is pivotally coupled to the main pedal body 14 to move about an additional second pivot axis Y, the additional second pivot axis Y being farther from the pedal axle 12 than the additional first pivot axis X. The additional first biasing member 20 is disposed on the additional second pivot axis Y. The additional first biasing member 20 is operatively disposed between the main pedal body 14 and the additional first cleat securing member 16 to bias the additional first cleat securing member 16 toward the additional first position. The additional first cleat securing member 16, the additional sub member 18, the additional first biasing member 20 and the additional first and second pivot axes X and Y are arranged relative to the main pedal body 14 so that the additional first cleat securing member 16 and the additional sub member 18 rotate together about the additional second pivot axis Y until the additional sub member 18 abuts against the main pedal body, and the additional first cleat securing member 16 subsequently rotates toward the additional second position about the additional first pivot axis X independently from the additional sub member 18 during a step-in operation. The first cleat securing member 16 has a first cleat engagement surface 36*f*. The sub member 18 includes a second cleat securing member (central portion 42*a*), the second cleat securing member (central portion 42*a*) having a second cleat engagement surface (42*d*). The additional first cleat securing member 16 has an additional first cleat engagement surface 36*f*. The additional sub member 18 includes an additional second cleat securing member (central portion 42*a*), the additional second cleat securing member (central portion 42*a*) having an additional second cleat engagement surface (42*d*).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed (e.g., manufacturing tolerances).

Also it will be understood that although the terms "first", "second", etc. may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
   a pedal axle;
   a main pedal body rotatably supported on the pedal axle;
   a first cleat securing member pivotally coupled relative to the main pedal body about a first pivot axis between a first position and a second position;
   a sub-member pivotally coupled to the main pedal body to move about a second pivot axis, the second pivot axis being farther from the pedal axle than the first pivot axis; and
   at least a first biasing member disposed on the second pivot axis, the first biasing member being operatively disposed between the main pedal body and the first cleat securing member to bias the first cleat securing member toward the first position,
   the first cleat securing member, the sub-member, the first biasing member and the first and second pivot axes being arranged relative to the main pedal body so that the first cleat securing member and the sub-member rotate together about the second pivot axis until the sub-member abuts against the pedal body, and the first cleat securing member subsequently rotates toward the second position about the first pivot axis independently from the sub-member during a step-in operation.

2. The bicycle pedal according to claim 1, wherein
   the sub-member is mounted on the main pedal body by a support shaft that supports the first biasing member on the main pedal body.

3. The bicycle pedal according to claim 2, wherein
   the first biasing member includes at least one first torsion spring, and the support shaft extends through the coiled portion of the at least one first torsion spring.

4. The bicycle pedal according to claim 1, wherein
   the first cleat securing member is pivotally mounted on the sub-member about the first pivot axis.

5. The bicycle pedal according to claim 1, wherein
   the first cleat securing member has a first cleat engagement surface located farther from the second pivot axis than the first pivot axis.

6. The bicycle pedal according to claim 1, wherein
   the main pedal body includes an abutment member, the first cleat securing member and the sub-member rotate together until the sub-member abuts against the abutment member, and the first cleat securing member subsequently rotates toward the second position independently from the sub-member during a step-in operation.

7. The bicycle pedal according to claim 6, wherein
   the abutment member is coupled to the main pedal body in a press-fit manner.

8. The bicycle pedal according to claim wherein
   the abutment member is adjustably coupled to the main pedal body so that an amount of movement of the sub-member before contacting the abutment member is adjustable.

9. The bicycle pedal according to claim 1, further comprising
   a first biasing member adjustment mechanism coupled between the first cleat securing member and the first biasing member to adjust the biasing force applied to the first cleat securing member from the first biasing member.

10. The bicycle pedal according to claim 1, further comprising
    a second cleat securing member coupled to the main pedal body at a location spaced from the first cleat securing member to define a cleat receiving area between the first and second cleat securing members.

11. The bicycle pedal according to claim 1, further comprising
    an additional first cleat securing member pivotally coupled relative to the main pedal body about an additional first pivot axis between an additional first position and an additional second position;
    an additional sub-member pivotally coupled to the main pedal body to move about an additional second pivot axis, the additional second pivot axis being farther from the pedal axle than the additional first pivot axis; and
    at least an additional first biasing member disposed on the additional second pivot axis, the additional first biasing member being operatively disposed between the main pedal body and the additional first cleat securing member to bias the additional first cleat securing member toward the additional first position,
    the additional first cleat securing member, the additional sub-member, the additional first biasing member and the additional first and second pivot axes being arranged relative to the main pedal body so that the additional first cleat securing member and the additional sub-member rotate together about the additional second pivot axis until the additional sub-member abuts against the pedal body, and the additional first cleat securing member subsequently rotates toward the additional second position about the additional first pivot axis independently from the additional sub-member during a step-in operation, the first cleat securing member having a first cleat engagement surface, the sub-member including a second cleat securing member, the second cleat securing member having a second cleat engagement surface, the additional first cleat securing member having an additional first cleat engagement surface, and the additional sub-member including an additional second cleat securing member, the additional second cleat securing member having an additional second cleat engagement surface.

12. The bicycle pedal according to claim 1, further including a support shaft defining the second pivot axis, the cleat securing member being arranged to stop pivoting at the first position and the second position by contacting the support shaft.

13. A bicycle pedal comprising:

a pedal axle;

a main pedal body rotatably supported on the pedal axle;

a first cleat securing member pivotally disposed about a first pivot axis between a first position and a second position;

a sub member pivotally coupled to the main pedal body to move about a second pivot axis defined by a support shaft, the second pivot axis being stationary with respect to the main pedal body as the sub member pivots with respect to the main pedal body, and the second pivot axis being spaced farther from the pedal axle than the first pivot axis; and at least a first biasing member disposed on the second pivot axis, the first biasing member being operatively disposed between the main pedal body and the first cleat securing member, and biasing the first cleat securing member toward the first position that corresponds to a clamping position, the first cleat securing member being pivotally mounted on the sub member about the first pivot axis, the first cleat securing member and the sub member being rotatably supported together on the support shaft about the second pivot axis from the clamping position to an intermediate position of the first cleat securing member, and the sub member abutting against the main pedal body and being prevented from rotating with the first cleat securing member about the second pivot axis while the first cleat securing member is in the intermediate position, the first cleat securing member being further rotatably supported about the first pivot axis from the intermediate position toward the second position relative to the sub member.

* * * * *